Figure 1:
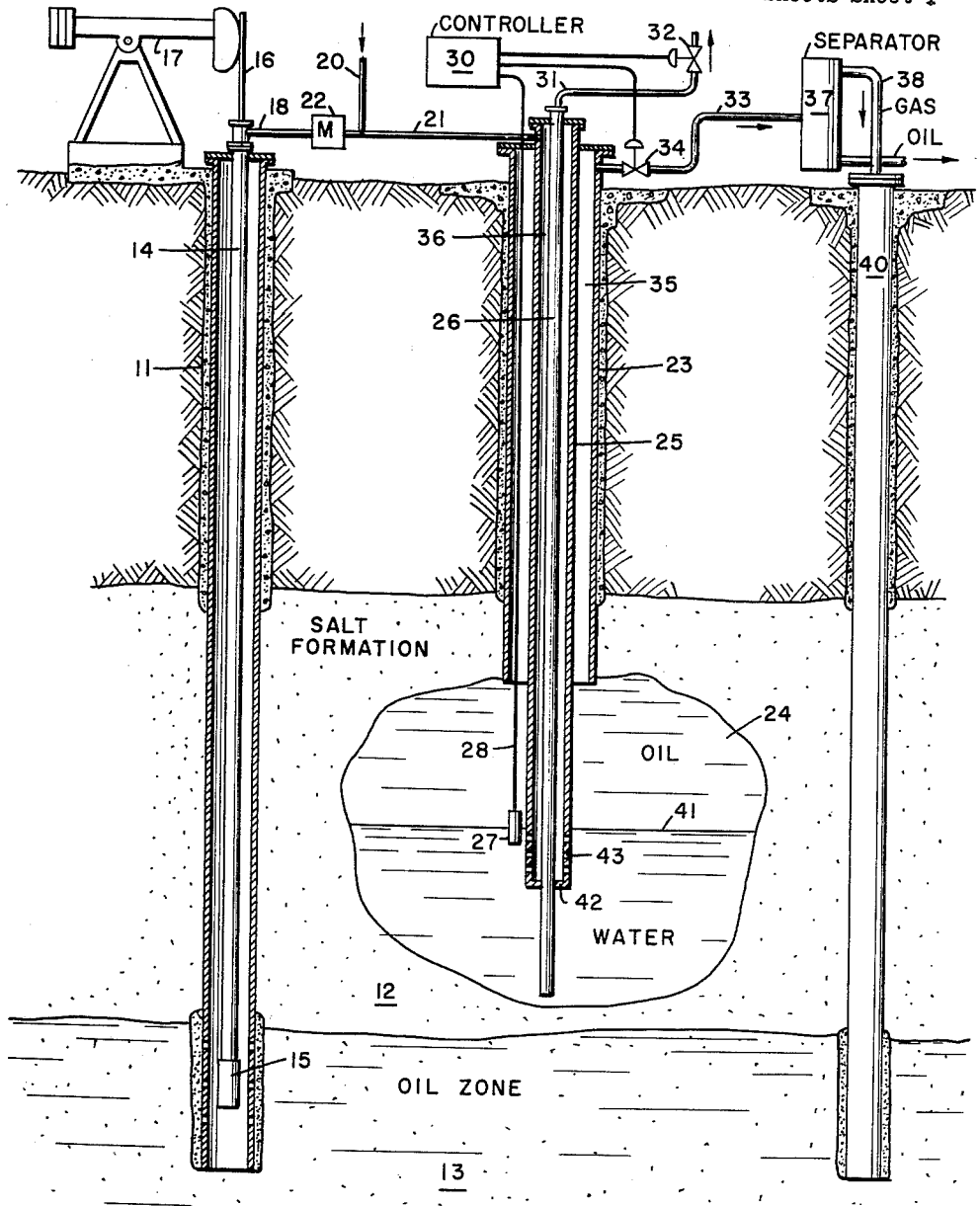

Dec. 4, 1962  J. W. McEVER  3,066,732
PRODUCTION OF CRUDE OIL
Filed Dec. 23, 1959  3 Sheets-Sheet 1

INVENTOR
J. W. McEVER
BY J. H. McCarthy
HIS AGENT

Dec. 4, 1962 J. W. McEVER 3,066,732
PRODUCTION OF CRUDE OIL
Filed Dec. 23, 1959 3 Sheets-Sheet 3

INVENTOR:
J. W. McEVER,
BY J. H. McCarthy
HIS AGENT

United States Patent Office 3,066,732
Patented Dec. 4, 1962

3,066,732
PRODUCTION OF CRUDE OIL
James W. McEver, Billings, Mont., assignor to Shell Oil Company, a corporation of Delaware
Filed Dec. 23, 1959, Ser. No. 861,514
6 Claims. (Cl. 166—7)

This invention relates to the production of crude oil from wells and pertains more particularly to the handling of oil field production fluids obtained from a well traversing earth formations containing oil and water, and at times gas, wherein at least a portion of the production fluid is in the form of an oil and water emulsion.

In many oil fields a certain amount of water is often produced with the oil as it is common for a water to be positioned below an oil in a formation, thus establishing what is commonly known in the field as a water-drive reservoir. In this particular type of reservoir, the water within the formation is generally under sufficient pressure to cause the oil located above it to be driven out of the well under pressure, thus obviating any need for pumping the well. In addition, the reservoir may contain a certain amount of gas which would be produced along with the oil and water. In other fields, water from other formations may become combined with oil from the oil formation.

Since wells which are caused to flow by pressure in the formation are generally capable of producing more fluid than is permitted under state proration laws, it is necessary to restrict the flow of production fluid from wells. In flowing wells this is generally done by inserting an orifice or flow bean in the production flowline, generally near the wellhead. As production fluid consisting of oil and water, or oil, gas and water, is forced through the flow bean, there is a sudden reduction in pressure on the downstream side of the flow bean which normally causes homogenization or emulsification of the fluids. In oil wells produced by a reciprocating well pump, a similar emulsification or partial emulsification of an oil and water production fluid takes place within the well, possibly caused by slippage of fluid past the plunger of the pump, or from other causes. In other cases, the produced fluid from some formations enters the wellbore as an emulsion or a partial emulsion.

Whatever the cause of the emulsification or partial emulsification of the production fluid may be, the resultant emulsified production fluid must be treated in a manner so as to separate the water from the oil prior to transporting the oil through pipelines to their refinery or to some other destination. In the past, it has been necessary to flow the emulsified production fluid through one or more various pieces of expensive equipment in order to break the emulsion, or to treat the emulsified production fluid with any of the various chemical emulsion breakers which are well known to the art.

It is therefore a primary object of the present invention to provide a method of producing a well traversing earth formation containing multiple-phase production fluids so that the various phases of the production fluid may be separated in an inexpensive and simple manner.

Another object of the present invention is to provide a method of producing a well wherein the production fluid comprises water and at least one hydrocarbon fluid wherein at least a portion of the production is in the form of an oil and water emulsion, the well being produced in a manner such that the water and the hydrocarbon fluid are readily separated so that the water may be discarded.

A further object of the present invention is to provide a method for producing a well in which the production fluid is in the form of an oil and water emulsion which can be separated underground with the water phase thereof being injected into an available water disposal formation in the vicinity.

Still another object of the present invention is to provide a method for producing an oil, gas and water well wherein in at least a portion of the production fluid is in the form of an emulsion which may be separated in a simple and inexpensive manner underground with the water phase being injected into an available water disposal formation while the gas is reinjected into the oil and gas producing formation to aid in maintaining the formation pressure therein.

Another object of the present invention is to provide a method of producing a well wherein the production fluid is in the form of a water and oil emulsion which may be safely separated underground thus eliminating the normal fire hazards which presently accompany such an operation aboveground.

Still another object of the present invention is to provide a method for producing an oil and water emulsion from a well and to separate the emulsion while maintaining the gravity of the oil substantially at its original value, that is, by treating it in a manner which inherently conserves the light ends in the oil which might otherwise be lost under present methods.

Figure 2:
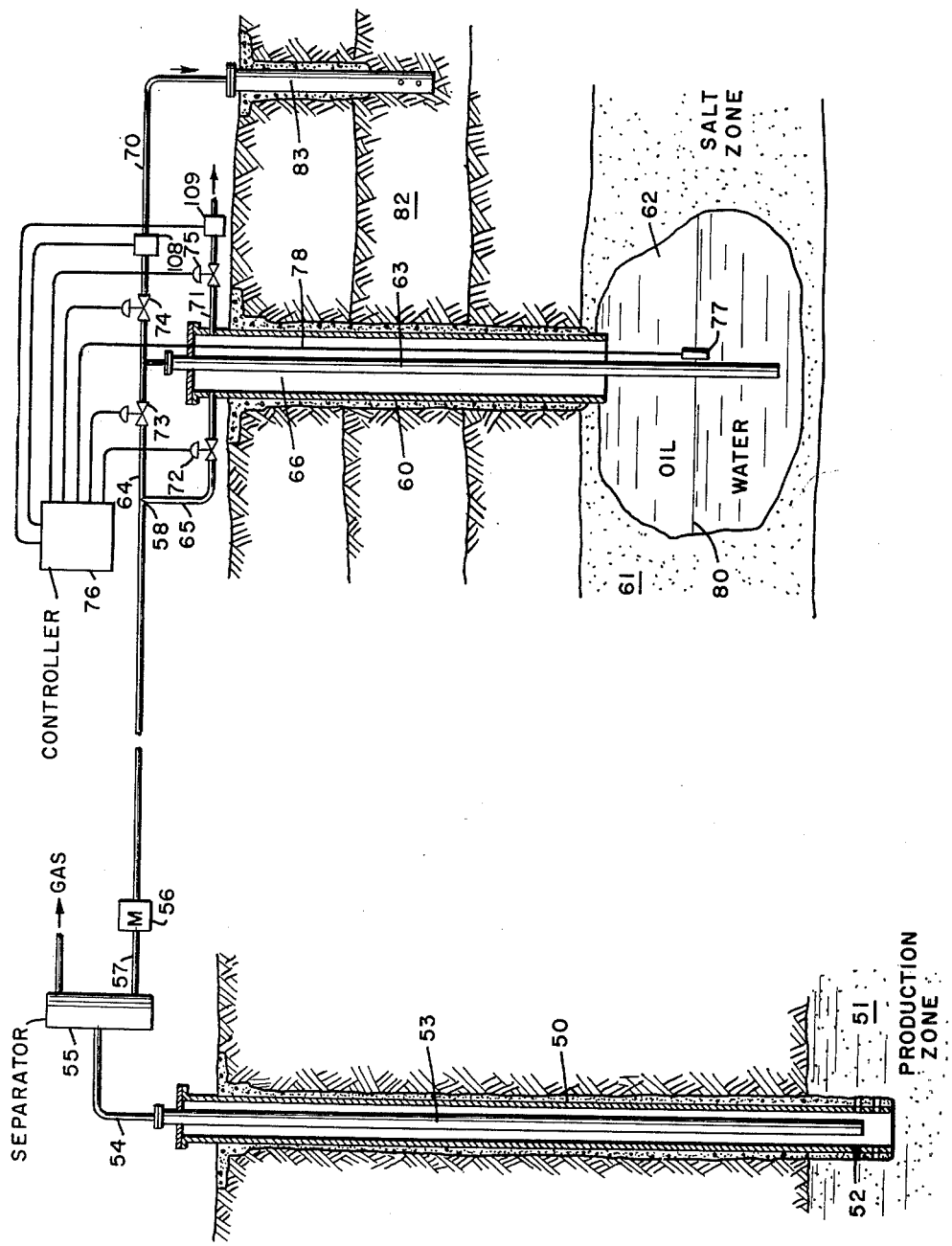
Figure 3:
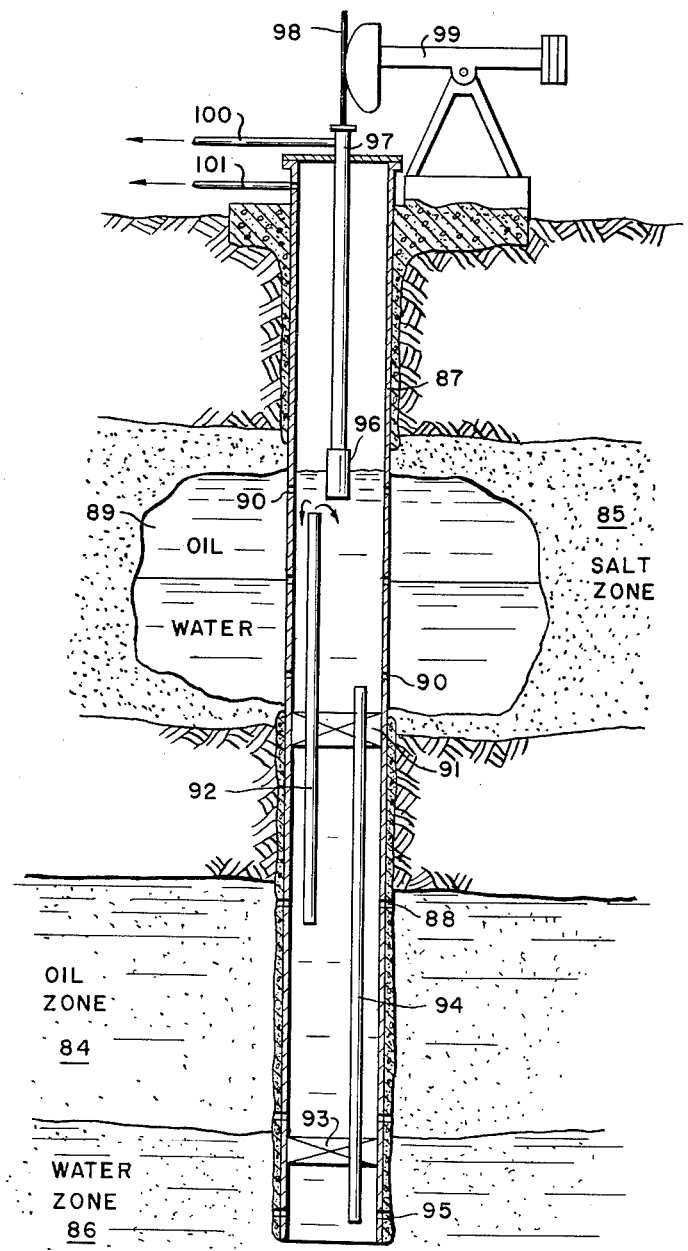

These and other objects of this invention will be understood from the following description when taken with reference to the attached drawing wherein:

FIGURE 1 is a schematic view of a vertical section taken through an oil field wherein a salt formation is positioned above the oil zone with two wells extending through the salt formation into the oil zone while a second well extends into the salt formation;

FIGURE 2 is a schematic view illustrating a pair of wells, one of the wells extending through the formations into an oil zone while the second well extends through various formations into a salt zone, the two wells being located in sufficiently close proximity that they may be connected together by means of fluid flowlines; and FIGURE 3 is a diagrammatic view taken longitudinally through an oil field and illustrating a well which traverses a salt zone, an oil zone, and a water zone.

Referring to FIGURE 1 of the drawing, a well is shown as having a well casing 11 closed at the top and extending downwardly through a salt formation 12 into an oil zone 13 located therebelow. Extending downwardly through said well casing 11 is a production tubing 14 having a pump 15 secured to the lower end thereof adjacent the oil zone 13. The pump 15 is of any type well known to the art, preferably one which is actuated by a reciprocating sucker rod string 16 which is raised up and down by a pumping unit 17.

A production flowline 18 is connected to the top of the production tubing 14 in open communication therewith and may join wtih one or more production flowlines 20 from other wells to become a common flowline 21 of a diameter sufficient to handle any number of wells. If desired, a meter 22 may be positioned in the production flowline 18 to meter the volume of fluid being produced by the well. A second well is positioned nearby with its well casing 23 extending down into the salt formation 12, being cemented in the well borehole in any suitable manner well known to the art.

At sometime prior to producing the wells in accordance with the present method, a cavity or cavern 24 of substantial size, say anywhere from 1,000 to 500,000 barrels, was formed in the salt formation 12 by a washing operation which mainly comprised pumping water down the well into the salt section to dissolve the salt which was carried out by the water as it was forced up the well again. Later a pair of concentric pipe strings or tubing strings 25 and 26 were arranged within the well casing 23 so that the intermediate pipe string 25 extended downwardly so that its lower end was substantially midway in the salt zone 12, while the lower end of the inner tubing string 26 extended to a point near the bottom of the salt cavity 24. The tops of the well casing 23 and the concentric pipe strings 25 and 26 are closed in a fluidtight manner. Alternatively, instead of washing out a cavern 24 of the size desired, a cavern may be started and then subsequently enlarged by the water phase of an oil and water emulsion when practicing the method of the present invention. It is quite evident that instead of employing concentric pipe strings 25 and 26, a pair of parallel pipe strings of the same length may be employed instead.

A suitable device for determining an oil-water interface is positioned at a predetermined level within the salt cavity 24, preferably by suspending the device 27, say, an electronic probe, from a signal transmitting cable 28. The upper end of the cable 28 in turn is electrically connected to a controller 30.

A flowline 31, having a valve 32 therein, is connected to the top of the inner tubing string 26 while a second flowline 33, having a valve 34 therein, extends through the wall of the well casing 23 near the top thereof so as to be in open communication with the annulus 35 between the well casing 23 and the intermediate pipe string 25. The valves 32 and 34 are preferably of any suitable power-actuated type, and are electrically connected to the controller 30 which is adapted to energize them. The annular space 36 between the intermediate pipe string 25 and the inner tubing string 26 communicates with flow conduit 21 which extends through the wall of the intermediate pipe string 25 near the top thereof, as illustrated. If desired the flow conduit 33 may be run to an oil and gas separator 37. The gas discharge line 38 from the oil-gas separator 37 may then be connected to the top of a well whose casing 40 extends downwardly through the salt formation 12 into the oil zone 13.

In practicing the method of the present invention when using the apparatus illustrated in FIGURE 1, oil is pumped from the oil zone 13 by means of the reciprocating pump 15 which raises the oil up the production tubing 14 and discharges it into the production flowline 18. During production of the oil, certain formation waters become mixed with the oil and by the time the production fluid is discharged into the production flowline 18 at least a portion of the oil and water have become emulsified to either an oil-in-water or a water-in-oil emulsion. If desired, the flow from the production flowline 18 may be commingled with production fluid from other adjacent wells which is piped through production flowline 20 so that the two flowlines join and become conduit 21. The combined production fluids are then run through conduit 21 into the annulus 36 between the inner tubing string 26 and the pipe string 25. As the production fluids are discharged into the salt cavity 24, the water which had been in the cavity 24 since the cavity was first formed is partially forced upwardly through the inner tubing string 26 and out the flowline 31 to be discharged out the wellhead and disposed of in any suitable manner desired. When the method of the present invention has been carried out for some time, say several weeks or months, an oil-water interface 41 will take a position which is centrally located with regard to the electronic interface detector or probe 27, which may be positioned at any desired level in the cavity 24. In the event that the production fluid from the tubing 14 is roughly a 50–50 mixture of water and oil, the electronic probe 27 is preferably positioned about midway in the cavity 24 so that there are approximately equal volumes of oil and water in the cavity 24. In some salt cavities of known volume where the location of the oil-water interface is known through suitable tests, the constant use of a probe 27 may be dispensed with and the valves 32 and 34 may be operated, either manually or automatically, on a timed cycle.

The incoming emulsion of production fluid is discharged at the level of the interface 41 of the fluids within the cavity. Alternatively, it is advantageous to have the intermediate pipe string 25 extend downwardly a distance sufficient so that the emulsified production fluid is discharged into and through a portion of the saturated water layer at the bottom of the cavity 24 as an aid in breaking the emulsion. The bottom of the intermediate pipe string 25 may be closed by means of a cap 42 with side openings 43 provided so that the flowing fluid has a tendency to flow horizontally within the cavity 24. The incoming emulsion comes in contact with the substantially saturated water layer stored in the lower half of the cavity 24 which is in contact with the solid salt formation surrounding the cavity 24. The emulsion, as soon as it is discharged into the cavity 24, is subjected to the conditions of temperature and pressure and salt saturation at which the particular cavity 24 is operated. The salinity of the water in the bottom of the salt cavity 24 is generally in the range of about 90–100% saturation depending upon the speed at which the water phase enters and is removed from the salt cavity 24. The incoming emulsion as well as the rest of the fluid in the cavity 24 is subjected to the natural heat of the formation which depends upon the depth of the salt cavity 24, the minimum temperature being employed would be about 100° F. (although in some instances this temperature may be somewhat lower) with the maximum being 250° F. or more. In one well extending through a salt formation a temperature is close to 200° F. at 8,800 feet. The average temperature of the fluids in the salt cavity of this well is generally at 150° F. or more for a cavity of 25,000 barrels capacity. Because of the small amount of fluid produced from a well, or even from a large number of wells, compared to the capacity of the salt cavity 24, any portion of the emulsion may be subjected to the conditions of temperature, pressure and salinity within the cavity for as much as 50 days or more.

The exact mechanism by which the emulsified production fluid is caused to separate into the separate phases is not clearly understood but it has been found that a complete separation of the fluids is obtained under conditions of time, temperature and/or pressure employed in the present method. The pressure which is applied to the emulsion as it is discharged at substantially the interface 41 within the cavity 24 is equal to the hydrostatic head of the column of fluid above the interface 41, which in one case is about 5,500 feet to the middle of the cavity. No extraneous heat need be added to the fluid within the cavity to break the emulsion therein nor is it necessary in most instances to add any chemicals.

The valves 32 and 34 are employed to maintain a back pressure on the system, and to discharge preferably one fluid at a time, either the oil or the water, from the salt cavity 24. Thus, with water being discharged up the inner tubing string 26 and out the flowline 31, the interface 41 in the cavity 24 starts to fall. After it has fallen a predetermined amount, this change in condition is noted by the electronic probe 27 which transmits the signal to controller 30 so that valve 32 in flowline 31 is closed while valve 34 in flowline 33 is opened. With the valve set in this position oil is then forced up the annulus 35 between the casing string 23 and the intermediate pipe string 25 to be discharged out the flowline 33. In the event that gas is entrained in with the oil, as is often the case, the oil and gas would be produced together through flowline 33. If desired, this combined oil and gas would be run into an oil and gas separator 37 from which the separated gas phase may, if desired, be pumped down another well 40 in communication with the oil zone 13 to repressurize the oil zone 13. The oil from the separator 37 would then be pumped to storage or to a pipeline, as desired. It is to be understood that the gas separator 37 could be inserted in flowline 21 to remove any gas from the emulsified production fluid prior to pumping it down into the salt cavity 20.

The method of the present invention can also be practiced by the apparatus shown in FIGURE 2 of the drawing, wherein the production well may be located some distance from the treating well, even in another field. For example, in FIGURE 2, a well casing 50 is shown as traversing earth strata and extending into a production zone 51 at which level the well casing 50 is provided with perforations 52. A production tubing 53 extends downwardly through the closed top of the well casing 50 to a point adjacent the production zone 51. Since no pump is provided, the well may be considered to be a flowing well. A production flowline 54 is connected to the top of the production tubing 53. In the event that the well is producing gas along with oil and water, the production flowline 54 may be connected to a separator 55 which removes the gas from the production fluid. The gas may be handled in any desired manner, either flared, sent to a gas transmission pipeline or reinjected into the producing formation 51 as described previously with regard to FIGURE 1. If desired, a meter 56 may be inserted in the oil-water flowline 57 coming from the separator 55.

At some point, preferably near a second well having a well casing 60 extending into a salt zone 61 in which a cavity 62 is formed, with a production tubing extending through said well casing to a point near the bottom of said cavity 62, the production flowline 54 or the flowline 57 is branched, as at 58, into two flowlines 64 and 65. One flowline 64 is connected into the top of the tubing string 63 while the second flowline 65 communicates, through the wall of the well casing 60 near the top thereof, with the annular space 66 between the well casing 60 and the tubing string 63.

The top of the tubing string 63 is also provided with a discharge line 70 through which water may be discharged from the salt cavity 62 while an oil discharge line 71 extends through the wall of the well casing near the top thereof to communicate with the annular space 66 between the well casing and the tubing string 63. The emulsified production fluid flowlines 64 and 65 are provided with power-actuated valves 73 and 72, respectively, while the discharge lines 70 and 71 from the well are provided with similar valves 74 and 75. While manually-operated valves may be employed, instead, power actuated valves 72, 73, 74 and 75 are preferably employed and are electrically connected to a suitable controller 76 which selectively transmits energizing signals to the various valves in the desired sequence. A water-oil interface detector 77, similar to the electronic probe 27 shown in FIGURE 1, is positioned in the salt cavern 62 at the desired level where the interface is to be maintained. The interface detector 77 is connected by means of an electrical transmission cable 78 to the controller 76.

In the operation of the apparatus of FIGURE 2, production fluid comprising oil and water emulsified, or a combination of oil, gas and water either wholly or partially emulsified, is forced from the production well up the tubing 53 by the formation pressure. The production fluid is then transported by means of the production flowline 54 to the junction point 58 at which point the flow is directed either into conduit 64 or 65. The controller 76 is of a type which, upon sensing through probe 77 a drop or lowering of the interface 80 beyond a certain point, transmits a signal to energize the valves so that valves 74 and 72 would be closed while valves 73 and 75 would be open. Thus, where the emulsified production fluid had previously been flowing through conduit 65 and thence down annulus 66 to the cavity 62 while it forced water from the bottom of the cavity up the tubing string 63 the emulsified production fluid would now be forced through conduit 64 and down the tubing 63 to the bottom of the cavity where it would be exposed to the conditions of pressure and temperature existing in the cavity 62.

The emulsified fluid separates in the cavity 62 with the oil phase of the production fluid rising to the top of the cavity 62 while the water settles out. Previously, when the emulsified production fluid had been forced into the annulus 66 near the top thereof the fluid would pass down through the oil at the top of the cavity and in the annulus 66, with the water phase of the production fluid settling down to the bottom of the cavity. There is little if any contamination of the oil in the annulus 66 at the time the oil is again forced from the cavity 62 due to the large volumes of fluid handled or contained in the salt cavity 62 as compared to the small amount of fluid contained between, say, a 5-inch well string and a 2⅞-inch diameter tubing string 63.

Alternatively, instead of employing an interface detector within the cavity 62, similar devices known as water-cut indicators 108 and 109 may be positioned in flowlines 70 and 71, respectively, and connected to the controller 76 for supplying thereto signals to operate valves 72, 73, 74 and 75. When using water-cut indicators, preferably of the capacitance-cell type which are well known to the art, the operation of the apparatus of FIGURE 2 would take place in the following manner. As emulsion fluid was forced through open valve 72 in conduit 65 and down through the annulus 66, water in the bottom of the cavity 62 would be forced up the tubing string 63 and through open valve 74 and water-cut indicator 108. After all the water had been displaced from the cavity oil would then flow from it. As the oil entered the water-cut indicator 108, the controller 76 is energized and puts out a signal to close valves 72 and 74 and open valves 73 and 75. Emulsion fluid is then routed down the tubing string 63 as oil is forced up the annulus 66 and out discharge line 71 through valve 75 and water-cut indicator 109. After all the oil has been forced out of the cavity 62 and water starts to come out, the passage of any water through the indicator 109 again energizes the controller 76 to reverse the valves 72, 73, 74 and 75 to their former position.

In most locations where the arrangement of FIGURE 2 would be employed, the actual switching of flow through conduit 64 to conduit 65 would take place at considerable intervals of time especially if only a few wells were concerned. In one particular field wherein the production from a considerable number of wells is combined to produce approximately 2,000 barrels of oil and 800 barrels of water per day, a salt cavity 62 having a capacity of at least 25,000 barrels can be efficiently operated on a schedule in which 5 days production is injected into the cavity 62 through the flow conduit 65 with water being discharged out the tubing string 63, before the valves are reset so that the next approximately 12 days production of fluid passes through flow conduit 64 and down the tubing string 63 while oil is forced out of the tubing casing annulus 66 through discharge line 71. The cycle would then be repeated.

The water phase, as it is discharged through conduit 70, may be disposed of in any suitable manner. For example, it may be run to a chemical plant where the salt content is removed and used.

As illustrated in FIGURE 2, a well is shown as having been drilled into a depleted formation or into a porous zone which will serve as a water disposal formation. A well casing 83 is installed in the well so that it terminates in the water disposal zone 82. Thus, if such an arrangement is available in the field or in an adjacent field, the water being discharged out the production tubing 63 and through the water discharge line 70 may be directed to the top of the well casing 83 to be forced to the bottom thereof and thence into the water disposal zone 82.

The method of the present invention may also be practiced in a single well by means of suitable apparatus, such as that illustrated in FIGURE 3 of the drawing. In many oil fields, such as some in the Williston Basin in Montana, a well drilled into an oil-producing formation 84 traverses a substantial salt interval or salt zone 85. In some cases a water-producing formation 86 may underlie the oil formation 84. Thus, after drilling the well, a well casing 87 is cemented in the well borehole and is perforated opposite the oil-producing formation as at 88.

Prior to practicing the method of the present invention, a salt cavity 89 would be formed in the salt zone 85 in any suitable manner. For example, a series of perforations 90 may be formed in the well casing 87 after which a temporary packer (not shown) would be placed intermediate the ends of the perforated section of casing so that water could be pumped down to the lowermost perforations in the salt zone and circulated outside the well casing 87 and thence back into the well casing through the upper perforations in a manner such that the salt is dissolved outside the well casing 87 to form the cavity 89. A packer 91 of any suitable type is positioned in the well casing above the oil zone 84. A standpipe 92 extends through the packer 91 in open communication between the oil zone 84 and the upper portion of the salt cavity 89. A second packer or bridging plug 93 is positioned in the well casing 87 between the oil zone 84 and the water zone 86. A second conduit 94 is positioned in the well casing 87 in a manner such that it extends through the casing closure members 91 and 93 so that it is in open communication with the space above member 91 and with the space below member 93. The well casing 87 is preferably provided with perforations 95 at a point adjacent the water zone 86 and below the packer member 93.

In order to remove oil from the well casing 87 at a point adjacent the salt zone 85, a well pump, preferably one of the reciprocating type 96 is installed in the well casing in a manner well known to the art and is provided with a production tubing 97 and a sucker rod string 98 which is reciprocated by a suitable pumping mechanism 99. The production tubing 97 is provided with an oil discharge line 100 while the well casing 87 may be provided with a side outlet 101 through which gas may be discharged from the well. The pump 96 is positioned at a depth so that at least its lower end is immersed in the oil layer within the cavity 89, preferably at a point above the upper end of the standpipe 92.

In practicing the method of the present invention by using the apparatus shown in FIGURE 3, the oil, and some water which may cone into it from the water zone 86, is produced through perforations 88 and up the standpipe 92 to be discharged into the oil layer within the cavity 89. For this operation it is assumed that the pressure of the oil zone 84 is sufficient to lift the oil to the discharge end of the standpipe 92. The emulsion will flow out some of the perforations 90 and will come in contact with the oil outside the casing which has been heated to a temperature substantially that of the formation. The free water from the production fluid will drop out to the bottom of the salt cavity while the emulsified water will slowly separate. Water at the bottom of the salt cavity 89 will flow into the casing through the lower perforations 90 and thence downwardly through conduit 94 into the well casing below the packer 93. From here the water is forced by the hydrostatic head of pressure above it through the perforations 95 or through the open bottom of the well casing into the water zone 86 to aid in restoring the water pressure drive below the oil zone 84, or merely to dispose of the water, depending upon the particular type of formation that is available. It is generally necessary to pump the oil from the salt cavity 89 except in the case where the salt zone 85 is at a very shallow depth, in which case it would be possible to flow the oil out conduit 101 that was provided for the gas, without building up a hydrostatic head that would prevent the production fluid from being forced out of the producing zone. This is possible especially if the producing zone was under high pressure.

In producing oil containing emulsified water therein by the method of the present invention, it may be seen that the present method provides for an efficient separation of the oil and water phases, which separation is carried out within a salt cavity under the lower temperatures provided from the heat of the formation, and with a much longer settling time being made available by the vast capacity of the salt cavity. Additionally, since the production fluid is heated to a lower temperature by the method of the present invention, and since it leaves the heated zone at a much slower rate than under normal treating conditions, the lighter fractions of the oil are not evaporated off or destroyed, hence preserving the gravity of the oil.

I claim as my invention:

1. A method of producing a well traversing earth formations containing a production fluid of water and at least one hydrocarbon fluid wherein at least a portion of the production fluid is an oil and water emulsion, said method comprising the steps of removing a multiple-phase production fluid from a producing zone of a well producing water and a hydrocarbon fluid, flowing at least the oil and water emulsion of said production fluid into a cavern formed in an impervious underground salt formation and having a well extending thereinto, said production fluid being in said cavern in contact with the salt formation therein for a period and at a temperature sufficient to bring about separation of the diverse fluids making up the production fluid, and subsequently removing at least the separated hydrocarbon phase of said production fluid from the salt zone of said well.

2. A method of producing a well traversing earth formations containing a production fluid of water and at least one hydrocarbon fluid wherein at least a portion of the production fluid is an oil and water emulsion, said method comprising the steps of removing a multiple-phase production fluid from a producing zone of a well producing water and a hydrocarbon, flowing at least the oil and water emulsion of said production fluid into a second well extending at least into an impervious underground salt formation, said production fluid being in said well in contact with the salt formation therein for a period and at a temperature sufficient to bring about separation of the diverse fluids making up the production fluid, and subsequently separately flowing the separated water and hydrocarbon phases of said production fluid from said second well.

3. A method of producing a well traversing earth formations containing a production fluid of at least water and oil wherein at least a portion of the production fluid is an oil and water emulsion, said method comprising the steps of removing a multiple-phase production fluid from a well producing at least oil and water, flowing at least the oil and water emulsion of said production fluid through a second well extending at least into an impervious underground salt formation having a storage cavern formed therein, storing said production fluid in said cavern in contact with the salt formation therein for a period and at a temperature sufficient to bring about separation of the diverse fluids making up the production fluid, and subsequently flowing at least the separated oil phase of said production fluid from the salt cavern of said second well.

4. A method of producing a well traversing earth formations containing a production fluid of at least water and oil wherein at least a portion of the production fluid is an oil and water emulsion, said method comprising the steps of removing a multiple-phase production fluid from a producing zone of a well producing at least oil and water, flowing at least the oil and water emulsion of said production fluid through a second well extending at least into a washed-out cavern formed within an impervious underground salt formation whereby said production fluid is brought into contact with said salt formation, storing said production fluids in said well in contact with the salt formation therein for a period and at a temperature sufficient to bring about separation of the diverse fluids making up the production fluid, subsequently separately flowing the separated water and oil phases of said production fluid from the salt zone of said second well, and flowing said water phase of said production fluid through at least a portion of said second well and into a water-receptive underground formation traversed by one of said wells.

5. A method of producing a well traversing earth formations containing a production fluid of water and oil and gas wherein at least a portion of the production fluid is an oil and water emulsion, said method comprising the steps of removing a multiple-phase production fluid from a producing zone of an oil and water and gas production well, separating the gas phase from the production fluid, flowing the water and oil phases of the production fluid into a second well extending at least into a cavern formed within an impervious underground salt formation whereby said production fluid is brought into contact with said salt formation, storing said production fluid in said well in contact with the salt formation therein for a period and at a pressure and temperature sufficient to bring about separation of the diverse fluids making up the production fluid, and subsequently separately flowing the separated water and hydrocarbon phases of said production fluid from the salt zone of said second well.

6. A mehod of producing a well traversing earth formations containing a production fluid of at least water and oil wherein at least a portion of the production fluid is an oil and water emulsion, said method comprising the steps of flowing a multiple-phase production fluid from a producing zone of an oil and water and gas production well, flowing said production fluid into a cavern formed within an impervious underground salt formation traversed by said well, storing said production fluid in said well in contact with the salt formation therein for a period and at a pressure and temperature sufficient to bring about separation of the diverse fluids making up the production fluid, subsequently flowing the separated water phase of said production fluid into a water-receptive formation traversed by said well through conduit means in communication between the lower portion of said cavern and said water-receptive formation, and raising the separated oil phase of said production fluid to the top of said well.

References Cited in the file of this patent

UNITED STATES PATENTS

| | | |
|---|---|---|
| 2,194,616 | Schoeneck | Mar. 26, 1940 |
| 2,787,455 | Knappen | Apr. 2, 1957 |
| 3,003,322 | Jordan | Oct. 10, 1961 |

OTHER REFERENCES

Uren, L. P.: "Petroleum Production Engineering," Exploitation Volume, 2nd edition, pages 489–491, McGraw-Hill, Inc., 1939.